(12) United States Patent
Peter

(10) Patent No.: US 7,191,972 B2
(45) Date of Patent: Mar. 20, 2007

(54) BELT RETRACTOR

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 423 days.

(21) Appl. No.: 10/234,012

(22) Filed: Sep. 3, 2002

(65) Prior Publication Data

US 2003/0066923 A1    Apr. 10, 2003

(30) Foreign Application Priority Data

Sep. 6, 2001    (DE) ............... 101 43 759

(51) Int. Cl.
*B65H 75/48*    (2006.01)
(52) U.S. Cl. .................. 242/374; 242/390.8
(58) Field of Classification Search ............. 242/374, 242/390.8; 280/806
See application file for complete search history.

(56) References Cited

U.S. PATENT DOCUMENTS

| | | | |
|---|---|---|---|
| 4,655,312 A | 4/1987 | Frantom et al. | |
| 4,666,097 A | 5/1987 | Tsuge et al. | |
| 5,141,178 A * | 8/1992 | Alden et al. | 244/135 A |
| 5,558,370 A | 9/1996 | Behr | |
| 5,765,774 A | 6/1998 | Maekawa et al. | |
| 5,788,281 A | 8/1998 | Yanagi et al. | |
| 6,387,294 B1 | 5/2002 | Yamashita et al. | |
| 6,439,494 B1 * | 8/2002 | Specht et al. | 242/379.1 |
| 6,447,012 B2 * | 9/2002 | Peter et al. | 280/806 |
| 6,578,649 B1 | 6/2003 | Shimasaki et al. | |
| 6,598,823 B1 * | 7/2003 | Fujii et al. | 242/390.8 |
| 2001/0030255 A1 * | 10/2001 | Peter | 242/383 |
| 2002/0011537 A1 * | 1/2002 | Durrstein et al. | 242/390.8 |

FOREIGN PATENT DOCUMENTS

| | | |
|---|---|---|
| DE | 3019298 A1 | 11/1981 |
| DE | 4302042 A1 | 7/1994 |
| DE | 19731689 C2 | 7/1999 |
| DE | 19905703 C1 | 9/2000 |
| DE | 19959956 A1 | 6/2001 |
| DE | 19961799 A1 | 7/2001 |
| EP | 1104729 A2 | 6/2001 |
| JP | 7264818 | 10/1995 |
| JP | 10-167003 | 6/1998 |
| JP | 10-167006 | 6/1998 |
| JP | 1198790 | 4/1999 |

(Continued)

OTHER PUBLICATIONS

Pending U.S. Peter et al. Patent Application Serial No. 09/726,666, filed Nov. 29, 2000 entitled "Belt Retractor System", Attorney Docket No. TRW(AEC)5619.

*Primary Examiner*—William A. Rivera
*Assistant Examiner*—Sang Kim
(74) *Attorney, Agent, or Firm*—Tarolli, Sundheim, Covell & Tummino LLP

(57) ABSTRACT

The belt retractor has a belt spool (12) mounted rotatably in a frame (10) and a drive motor (28) coupled to the belt spool (12) via a belt drive (14, 24, 22). This drive motor (28) is a brushless direct current motor with an internal rotor that has a starting torque of at least 2 Nm.

9 Claims, 2 Drawing Sheets

FOREIGN PATENT DOCUMENTS

Figure 1:
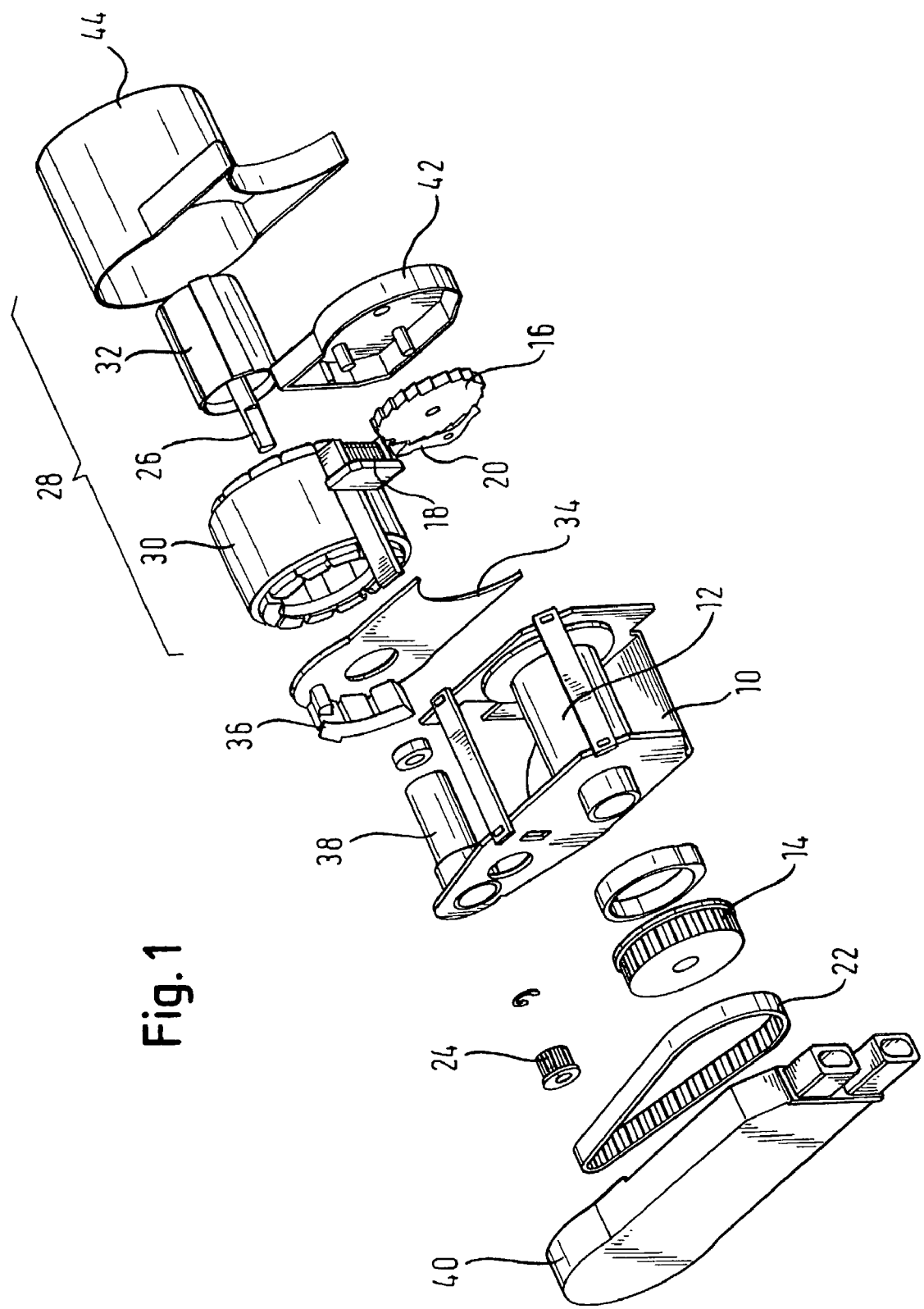

| | | |
|---|---|---|
| JP | 2000118352 | 4/2000 |
| JP | 2000209827 | 7/2000 |
| JP | 2000209831 | 7/2000 |
| JP | 2000245007 | 9/2000 |
| JP | 2000245008 | 9/2000 |
| JP | 2000245009 | 9/2000 |
| JP | 2000324774 | 11/2000 |
| JP | 2001118710 | 4/2001 |
| JP | 2001187561 | 7/2001 |
| JP | 2001204145 | 7/2001 |

* cited by examiner

BELT RETRACTOR

FIELD OF THE INVENTION

The present invention relates to a belt retractor with a belt spool mounted rotatably in a frame and with a drive motor coupled to the belt spool via a reduction gear.

BACKGROUND OF THE INVENTION

With a belt retractor that has a belt spool mounted rotatably in a frame and a drive motor coupled to the belt spool via a reduction gear, the drive motor can assume the retraction function, which is performed by a winding spring in conventional belt retractors. By appropriately actuating the drive motor, the belt force can be varied corresponding to the operating state of the belt retractor. In the contact area, the belt force is reduced in order to improve the wearing comfort; in the retraction area, the belt force is increased in order to ensure complete winding up of the seatbelt. Moreover, the drive motor can carry out a pretensioning of the seatbelt in order to prepare a possibly necessary tensioning of the seatbelt by means of a pyrotechnical belt tensioner. A direct emergency tensioning by the drive motor alone has not yet been considered as an option since the technology available can achieve neither the high belt forces nor the short response times that are necessary in such cases. Thus, for the belt tensioning, it is generally required that 120 mm of belt slack to be retracted within less than 30 ms. The normally used pyrotechnical belt tensioners generate belt forces of over 1000 N. Available electric motors that would be able to generate similarly high forces are too large and too heavy to reach the necessary speed within the short period of time of less than 30 ms.

SUMMARY OF THE INVENTION

The invention provides a belt retractor having an electric drive motor with which the tensioning function is ensured exclusively by the drive motor, as a result of which it is possible to dispense with a separate pyrotechnical tensioning drive. In the belt retractor according to the invention, the drive motor is coupled to the belt spool via a reduction gear. The drive motor is a brushless direct current motor with an internal rotor. This direct current motor has a high starting torque of at least about 2 Nm, preferably in the range of 2 Nm to 5 Nm or slightly above. The invention is based on the realization that several measures are necessary in combination in order to ensure the short response time as well as the belt force. For one thing, the rotor of the drive motor has to have a low moment of inertia. This requirement is met by a brushless direct current motor with an internal rotor. Basically, external rotors have an especially high torque, but at the same time, also a high moment of inertia. Therefore, the rotor must be of the internal type. Moreover, brushless direct current motors—at least briefly—allow extremely high current loads, so that a relatively large starting torque of at least 2 Nm can be achieved without difficulty. In conjunction with the low moment of inertia, the high starting torque of the direct current motor allows it to accelerate to several thousand revolutions per minute within just a few milliseconds.

Another contribution to the high retraction capacity is made by the reduction gear, which is configured as a belt drive and has a reduction ratio of just 1:3 to 1:5. Such a reduction gear stands out for its especially high efficiency of at least 90%.

In order to limit the amount of current strength needed in the stator coils, it is advantageous to operate the direct current motor with the on-board vehicle voltage of 42 V.

SHORT DESCRIPTION OF DRAWINGS

Additional features and characteristics ensue from the description below and from the accompanying drawings to which reference is made. The drawings show the following:

FIG. 1—the belt retractor in an exploded view; and

Figure 2:
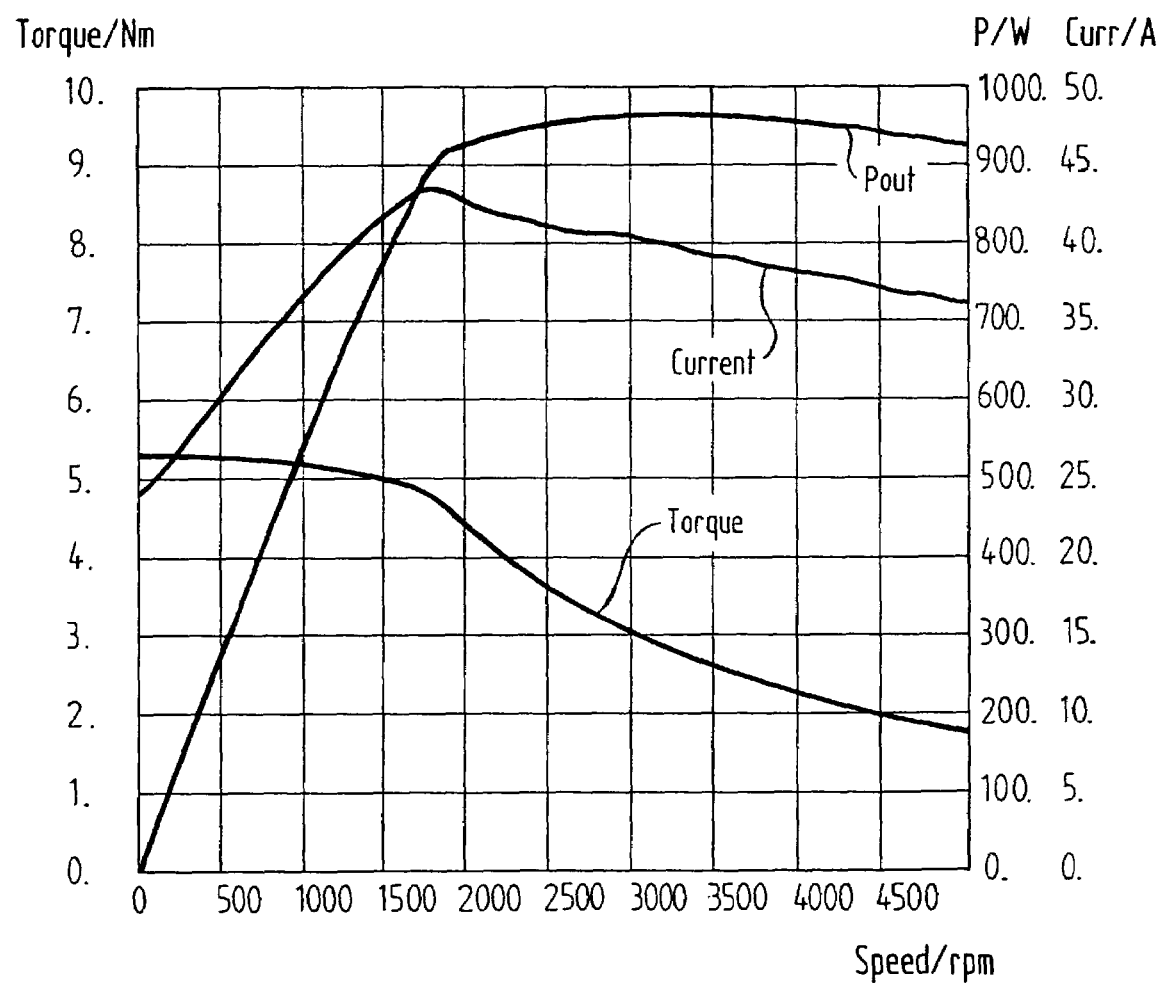

FIG. 2—a diagram that shows the characteristic curves of the direct current motor used.

DETAILED DESCRIPTION OF PREFERRED EMBODIMENT

The belt retractor has a belt spool 12 mounted rotatably in a frame 10. A toothed belt disk 14 is attached to one of the axial ends of the belt spool 12. A locking disk 16 with external teeth is connected to the opposite axial end of the belt spool 12, said locking disk 16 interacting with a locking pawl 20 that can be actuated by an electromagnet 18. The toothed belt disk 14 is coupled via a toothed belt 22 to a pinion 24 that is attached to the shaft 26 of a direct current motor generally designated with the reference numeral 28. The direct current motor 28 is a brushless internal rotor with a stator 30 and a rotor 32 to which the shaft 26 is attached. The stator 30 is set up on a printed circuit board 34 that is placed laterally onto the frame 10. On the printed circuit board 34, there are power semiconductors 36 that are a component of an actuation circuit for the direct current motor 28. The rotor 32 of the electric motor 28 is mounted in a bearing bushing 38 that is attached to one leg of the frame 10.

The belt drive that is made up of the toothed belt disk 14, the pinion 24 and the toothed belt 22 forms a reduction gear with a reduction ratio of 1:3 to 1:5 and it is covered by a hood 40 that is placed onto the adjacent leg of the frame 10.

The blocking mechanism that is made up of the locking disk 16, the locking pawl 20 and the electromagnet 18 is covered by a hood 42 that is placed onto the opposite leg of the frame 10.

Finally, the electric motor 28 is also covered by a hood 44 that is slid over the stator 30 and placed over the printed circuit board 34.

The rotor 32 of the electric motor 28 is equipped with rare-earth permanent magnets. It has a low moment of inertia of preferably $1.6 \times 10^{-5}$ kgm$^2$ and allows a fast start up with a high starting torque of at least 2 Nm. At higher moments of inertia up to about $3.5 \times 10^{-5}$ kgm$^2$, a higher starting torque up to about 5 Nm is needed. The stator 30 of the direct current motor 28 is preferably configured for an on-board voltage of 42 V so that the currents in the stator coils required for the necessary drive power remain within an easily controllable order of magnitude.

The characteristic curves of a brushless direct current motor with an internal rotor used in a preferred embodiment are shown in the diagram of FIG. 2. The diagram shows the drive moment, the current fed into the stator coils and the drawn electric power as a function of the rotational speed. A noteworthy aspect is the high starting torque of more than 5 Nm which, in combination with the low moment of inertia of the rotor, allows such a fast start-up of the drive motor with a belt force of over 800 N that a belt slack of 120 mm can be retracted within less than 30 ms. The belt forces that can be realized with this drive concept are less than with a pyrotechnical tensioning drive; in contrast to a pyrotechnical tensioning drive, with which a pneumatic drive pressure is built up very rapidly but drops very sharply after the maximum has been reached, the driving torque of an electric motor is retained during the entire procedure so that lower drive forces are sufficient.

The invented claim is:

1. A seat belt retractor for a vehicle, the seat belt retractor comprising:
    a frame;
    a spool upon which seat belt webbing is wound, the spool being rotatable relative to the frame in a first direction for retracting seat belt webbing onto the spool and in a second opposite direction during withdrawal of seat belt webbing from the spool;
    an electric motor that is actuatable for rotating the spool in the first direction for retracting seat belt webbing onto the spool, the electric motor being a brushless direct current motor with an internal rotor; and
    a reduction gear for coupling the internal rotor of the electric motor to the spool,
    the electric motor having a starting torque of at least 2 Nm and operable to rotate the spool in the first direction for retracting 120 millimeters of the seat belt webbing onto the spool in less than 30 milliseconds to provide emergency tensioning of the seat belt webbing.

2. The seat belt retiractor of claim 1 wherein the starting torque of the electric motor is in a range from about 2 Nm to about 5 Nm.

3. The seat belt retractor of claim 1 wherein the reduction gear comprises a belt drive and has a reduction ratio in a range of 1:3 to 71:5.

4. The seat belt retractor of claim 1 wherein the electric motor is operated with an on-board vehicle voltage of 42 V.

5. The seat belt retractor of claim 1 wherein the internal rotor of the electric motor has a moment of inertia in a range from about $1.5 \times 10^{-5}$ kgm$^2$ to about $3.5 \times 10^{-5}$ kgm$^2$.

6. The seat belt retractor of claim 1 wherein the internal rotor of the electric motor is equipped with rare-earth permanent magnets.

7. The seat belt retractor of claim 1 wherein a stator of the electric motor is set up on a printed circuit board that has power semiconductors of an actuation circuit for the electric motor.

8. A seat belt retractor for a vehicle, the seat belt retractor comprising:
    a frame;
    a spool upon which seat belt webbing is wound, the spool being rotatable relative to the frame in a first direction for retracting seat belt webbing onto the spool and in a second opposite direction during withdrawal of seat belt webbing from the spool;
    an electric motor that is actuatable for rotating the spool in the first direction for retracting seat belt webbing onto the spool, the electric motor being a brushless direct current motor with an internal rotor having a moment of inertia in a range from about $1.5 \times 10^{-5}$ kgm$^2$ to about $3.5 \times 10^{-5}$ kgm$^2$, the electric motor having a starting torque of at least 2 Nm and being operable for rotating the spool in the first direction for providing emergency tensioning of the seat belt webbing, during the emergency tensioning of the seat belt webbing the electric motor providing a belt force of over 800 N and retracting 120 millimeters of the seat belt webbing onto the spool in less than 30 milliseconds.

9. The seat belt retractor of claim 8 further including a reduction gear for coupling the internal rotor of the electric motor to the spool, the reduction gear being made up of a belt drive and having a reduction ratio in a range of 1:3 to 1:5.

* * * * *